UNITED STATES PATENT OFFICE.

ABRAHAM B. CONGER, OF NEW YORK, N. Y.

PREPARATION OF A FLUID FOR MAKING WATER-REPELLENT FABRICS.

SPECIFICATION forming part of Letters Patent No. 310,560, dated January 13, 1885.

Application filed September 10, 1881. Renewed June 20, 1884. (No specimens.)

*To all whom it may concern:*

Be it known that I, ABRAHAM B. CONGER, of the city, county, and State of New York, have invented certain new and useful Improvements in the preparation of a fluid for making water-repellent fabrics of various descriptions and texture, rendering them more desirable and durable for use and wear; and I do hereby declare that the following is a full, clear, and exact description of this my invention, which will enable others skilled in the art to which it appertains readily to make and use the same.

First. I make a solution of caoutchouc or other elastic gum and of paraffine or other wax, natural or artificial, (previously comminuted and the gum softened by naphthaline and benzole or boiling water,) in naphtha or other mineral oil, in a proportion varying, by weight, of one part each of the gum and wax to from seventy to two hundred and ten parts of the oil, according to the purity of the latter and the texture of the fabrics to be treated. It is to be understood, however, that in the formulas next hereinafter mentioned the medium proportion of one part each of the gum and wax to one hundred and forty parts of the oil is to be taken as the standard on which the treatment by such formulas or methods is based.

Second. This solution I proceed to treat by either of the following formulas or methods: (*a*) I take two parts each of water and sulphuric acid, each being, by weight, twice that of the gum and wax employed, mix them, and when cooled I pour the mixture on the solution, or vice versa, and then add one part of pulverized black oxide of manganese and one part of chloride of sodium, by weight, as aforesaid, (or this formula may be varied, as hereinafter mentioned in *b*,) provision having been made that the whole (to wit, the mixture and solution) shall have been combined, as aforesaid, in a vessel sufficiently large to hold the chlorine gas to be developed, after it shall have driven out the atmospheric air, and, being so held therein by simple contrivances, as corking or the like, may be absorbed by the said solution, agitation of the same being employed, if necessary, to hasten or insure such absorption, and thereafter water being added in sufficient quantity to hold the residuum or waste falling to the bottom of the vessel, so as to render the decanting of the solution, after it has absorbed such gas, easily practicable; or (*b*)—and as for the purpose of manufacturing the fluid designed by this invention on an extensive and economical scale—I place the gum, wax, and oil, in the proportion above given, in a suitable vessel, or in a cylinder, (with apparatus attached securing its revolution,) either being placed in water sufficiently heated to effect a solution of the wax and gum. Next, I develop chlorine from the water, acid, black oxide, and salt in the aforesaid proportions, or in any other proportions, as may be most effective in the development of chlorine from the said chemical ingredients in the several degrees of purity in which they may be when purchased for use, the said gas being developed in a vessel or vessels connected with the one first as above to be used, by glass or other tubing, one end of which is furnished with a rose of glass, or other crosswise material, duly punctured with minute holes, and placed below the surface of the solution of gum and wax, so as to permit the equable dissemination of the gas, or developed in other suitable vessels connected with a gasometer, with like tubing attached to the cylinder or vessel containing the solution, or directly with the cylinder, provision being made that the gas escaping from the flask unabsorbed may by like tubing pass over into other vessels, either empty or partly filled with the solution of gum and wax, or from the cylinder either into other cylinders or gasometers.

Third. After the gas has been acting on the solution from twelve to twenty-four hours, according to the activity of its absorption or the density of the solution, and when this has attained a dark brownish hue further devolution or intromission of the gas is discontinued, the solution, allowed to settle as to its residuum, is decanted or run off into other vessels or cylinders and washed or agitated with potash or other alkali dissolved in warm water.

Fourth. The solution is then allowed to stand until another settling occurs, when the presence of the slightest acid or alkaline reaction is determined by the litmus or turmeric test. Appropriate treatment must be further pursued until any such reaction entirely disappears, either by addition of the acid or alkali employed, or by dashing or agitating with warm water. The solution thereafter attains a perfectly clear or pellucid state, according to the proportion of the solid hydrocarbons it originally contained, and is the fluid designed by this invention, and ready for application to the fabrics to be treated by immersing them in it for a greater or less period of time, according to their thickness or the use or wear for which they are designed. On their being dried by any suitable agencies, which economy may readily suggest, they become water-repellent, more durable, impervious to moth and mildew, and incapable of permanent discoloration or stain.

Fifth. Instead of treating the solution effected as is above first described by the methods secondly and thirdly enumerated in its treatment with chlorine gas, I also use the vaporized gas of either nitrous, nitric, or muriatic acids, the latter always chemically pure, obtained by slow evaporation of either, or such acids, using the like adjustments and contrivances for the absorption of either by the solution, and proceed thereafter in its manipulation as particularly above set forth.

Having fully described my invention, what I desire to claim and secure by Letters Patent is—

1. The process of making a rapid solution of caoutchouc or other elastic gum in naphtha or other mineral oil by softening the gum previously to its being put in the oil, as above described and set forth.

2. The process of treating the solution of caoutchouc or other elastic gum (previously softened) and paraffine or other wax in naphtha or other mineral oil with chlorine gas, as above described and set forth.

3. The treatment of the solution of caoutchouc or other elastic gum and paraffine or other wax with the vaporized gases of nitric or muriatic acids chemically pure, as above described and set forth.

4. The process for the complete deprivation of the caoutchouc or other elastic gum of its viscous and resinous ingredients, of the other hydrocarbons employed of all trace of any oleaginous property, and for the rendering of the solution incapable of discoloration or other injury to the fabrics to be treated, as above described and set forth.

A. B. CONGER.

Witnesses:
   MILES F. POWERS,
   ANDREW J. VAN KEUREN.